(12) United States Patent
Wettroth et al.

(10) Patent No.: US 6,298,066 B1
(45) Date of Patent: Oct. 2, 2001

(54) SINGLE WIRE BUS INTERFACE FOR MULTIDROP APPLICATIONS

(75) Inventors: John M. Wettroth, Apex, NC (US); Charles M. Allen, Sunnyvale; Michael A. Ashburn, Mountain View, both of CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

(21) Appl. No.: 09/292,073

(22) Filed: Apr. 14, 1999

(51) Int. Cl.[7] .................................................. H04J 6/00
(52) U.S. Cl. ............................................. 370/449; 710/100
(58) Field of Search ............................ 370/449; 710/100, 710/29

(56) References Cited

U.S. PATENT DOCUMENTS

| | | | |
|---|---|---|---|
| 3,702,008 | * 10/1972 | Groth | 710/220 |
| 3,725,866 | * 4/1973 | Oldfield, Jr. et al. | |
| 4,148,240 | * 4/1979 | Moore et al. | |
| 4,149,144 | * 4/1979 | Diefenderfer | |
| 4,293,947 | * 10/1981 | Brittain | 370/449 |
| 4,370,561 | * 1/1983 | Briggs | 307/9.1 |
| 4,463,341 | * 7/1984 | Iwasaki | 340/310.01 |
| 4,677,308 | * 6/1987 | Wroblewski et al. | 340/459 |
| 4,736,367 | * 4/1988 | Wroblewski et al. | 370/449 |
| 4,907,223 | * 3/1990 | Wroblewski | 370/449 |
| 4,965,550 | * 10/1990 | Wroblewski | |
| 5,210,846 | 5/1993 | Lee | 395/425 |
| 5,390,351 | * 2/1995 | Giulio et al. | |
| 5,398,326 | 3/1995 | Lee | 395/425 |
| 5,469,150 | * 11/1995 | Sitte | 340/825.07 |
| 5,717,861 | * 2/1998 | Rabii | 709/232 |
| 5,761,697 | 6/1998 | Curry et al. | 711/100 |
| 5,809,518 | 9/1998 | Lee | 711/115 |
| 5,832,207 | 11/1998 | Little et al. | 395/186 |
| 5,917,813 | * 6/1999 | Driel et al. | 370/348 |
| 5,926,476 | * 7/1999 | Ghaibeh | |
| 5,936,520 | * 8/1999 | Luitje et al. | 340/517 |

* cited by examiner

Primary Examiner—Paul R. Myers
(74) Attorney, Agent, or Firm—Oppenheimer Wolff & Donnelly, LLP

(57) ABSTRACT

The present invention enables data communications between multiple devices over a single wire bus. This single-wire interface can be used for sensors, amplifiers, analog-to-digital converters (ADCs), or any other circuit which would normally have an electrical output. Advantages of the present invention include a reduction in device pin count, conservation of the limited number of I/O pins on the control device, and reduced board layout complexity. Speaking generally, each slave device coupled to the single wire bus interface is assigned a different response time window. This enables multiple slave devices to respond to an initial trigger signal generated by the master device without overlapping responses being generated on the single wire bus interface. A suitable slave electrical device includes application circuitry providing state information for the electrical device, an input/output pin suitable for making an electrical coupling external to the electrical device, and a single wire bus interface coupled to the input/output pin and the application circuitry. The single wire bus interface has conversion function circuitry defining a specific response time window for the electronic device. Further, the single wire bus interface is responsive to a start signal received on the input/output pin to generate a response signal within the specific response time window, the response signal indicative of the state information for the electrical device.

33 Claims, 6 Drawing Sheets

SINGLE WIRE BUS INTERFACE FOR MULTIDROP APPLICATIONS

DESCRIPTION

1. Technical Field

The present invention is related to interface circuitry between a master device and a slave device. More specifically, the present invention teaches a variety data communication methods between a master device and multiple analog slave devices using a single line data bus.

2. Background Art

Many electronics applications require a master device to communicate with multiple slave devices for purposes such as data monitoring or process control. A master device may be any device such as a controller, microprocessor or similar device that connects to and communicates with the slave devices. The slave devices may take on a variety of forms depending upon the specific application.

For example, a typical temperature monitoring system utilizes a microprocessor or micro controller as the master device and several temperature sensors as the slave devices. Such a temperature monitoring system is assembled with a dedicated data line coupling each temperature sensor and each microprocessor or micro controller input terminal. This temperature monitoring system allows the microprocessor or micro controller to collect data from each temperature sensing device. The microprocessor or micro controller can then process the collected data. As will be appreciated, this temperature monitoring system requires many data lines and an equal number of input terminals on the microprocessor or micro controller. These data lines form a data bus.

Prior art FIG. 1 illustrates a multidrop circuit 10 including a microprocessor or micro controller 20 (the master device) coupled to multiple input devices 40 (the slave devices) via a parallel data bus 30. The microprocessor 20 input terminal I/O1 is connected to the first input device 1. The input terminal I/O2 is connected to the second input device 2. The input terminal I/O3 is connected to the third input device 3. Additional input terminals are connected to additional devices following the similar scheme through to input terminal I/ON and the last input device N, respectively. Each microprocessor or micro controller 20 input terminal is connected to the respective input device 40 by a dedicated data line such as data lines 32 through 38 within the data bus 30.

The group of dedicated data lines 32 through 38 (and others not shown) taken together make up the data bus 30. In this prior art example, the bus is said to be a parallel bus since each device is assigned a discrete data line that runs together, or parallel, to one another between each individual input device and the microprocessor or micro controller input terminal.

When input device 1 produces a signal, the signal is transmitted through a dedicated data line in the data bus 30 to the micro controller 20 input terminal I/O1. Data output from each input device 40 is input to the microprocessor or micro controller 20 on a dedicated microprocessor or micro controller 20 input terminal.

A parallel data bus 30 requirement increases the number of I/O terminals required on the microprocessor or micro controller 20. If, for example, the multidrop system 10 of FIG. 1 had seventy-five input devices, a corresponding seventy-five input terminals on the microprocessor or micro controller 20 would also be required. This requirement increases the complexity and cost of the microprocessor or micro controller 20. In addition, the parallel data bus 30 adds additional complexity and cost to the data monitoring or communication system. These complex requirements increase the overall cost of production and material for data monitoring and communication systems.

As will be appreciated, a common application has the slave or input devices 40 as analog voltage output devices such as a temperature, voltage, pressure or acceleration sensor or any other analog output device. Analog input devices typically produce a variable voltage signal where the master device is capable of processing the voltage using a internal or external analog to digital converter (ADC) thereby converting the analog signal to digital data. The microprocessor or micro controller can then process the digital data.

Analog input devices may also produce a digital like signal if they produce discrete bits. Discrete bit devices produce only two types of signals, a high logic state and a low logic state. In many systems a low logic state corresponds to a high voltage state, typically $V_{cc}$. In such systems, the high logic state corresponds to a low voltage state, typically <1 vdc. The microprocessor or micro controller may process this data bit as a single data bit or as an analog signal as described above.

Prior art FIG. 2 illustrates another multidrop circuit 100 having a microprocessor 20 coupled to a access system 110 by multiple data lines of the parallel data bus 105. The access system is coupled to multiple input devices 120 by a single data line of the serial data bus 130. In this prior art example, the system has two data buses. The first data bus is a parallel data bus 105 coupling the microprocessor 20 with the access system 110. The second data bus is a serial data bus 130 coupling the access system 110 with the multiple input devices 120. The serial data bus 130 transports data from multiple input devices or components.

In this example, the serial data bus 130 transports data from the access system 110 and the multiple input devices 120. When the access system 110 needs an input from input device 1, the access system 110 will send a request or polling signal on the serial data bus 130 to input device 1. Input device 1 has been assigned a unique polling signal to respond to. Polling signals may be analog voltage or digital data stream instruction. Input device 1 only produces a signal after requested or polled by the access system 110. Similarly, subsequent input devices 2, 3, . . . N will be assigned unique polling signals and polled for data.

This prior art example reduces the number of and the dedicated data lines required in the parallel data bus 105 and the number of I/O terminals on the microprocessor 20 but adds the cost and complexity of the additional components such as the access system 110, the input devices 120 capable of responding to polling signals, and the second data bus 130. This adds additional components, complexity and cost to the system.

What is needed is a protocol for a multidrop circuit that lacks the complexity of both a parallel data bus and a serial data bus or the addition of access system type interface devices, yet is still capable of accurate data communication data across the multidrop circuit.

DISCLOSURE OF THE INVENTION

In order to achieve the foregoing the teaching of the present invention enables data communications between multiple devices over a single wire bus. This single-wire interface can be used for sensors, amplifiers, analog-to-digital converters (ADCs), or any other circuit which would normally have an electrical output. Advantages of the present invention include a reduction in device pin count, conservation of the limited number of I/O pins on the control device, and reduced board layout complexity.

Speaking generally, each slave device coupled to the single wire bus interface is assigned a different response time window. For example, each slave device may be manufactured with a different time conversion function assigned to encode its analog data. This enables multiple parts to respond to an initial trigger signal generated by the master device without overlapping responses being generated on the single wire bus interface.

A first aspect of the present invention teaches a method for controlling communication over the single wire bus interface for a multidrop circuit. Generally, the multidrop circuit includes a master device and a first slave device coupled together via the single wire bus and the first slave device is assigned a first response window. Steps involved in this method include initiating a timing sequence by transmitting a start command on the single wire bus interface and, during each response window, communicating data associated with the slave device that corresponds to that response window.

Another embodiment of the present invention teaches an electrical device suitable for use as a slave device in a multidrop application. In this embodiment, the multidrop application is arranged for data communications between a master device and multiple slave devices over a single wire bus, each electrical device assigned a different response time window. The slave electrical device includes application circuitry providing state information for the electrical device, an input/output pin suitable for making an electrical coupling external to the electrical device, and a single wire bus interface coupled to the input/output pin and the application circuitry. The single wire bus interface has conversion function circuitry defining a specific response time window for the electronic device. Further, the single wire bus is responsive to a start signal received on the input/output pin to generate a response signal within the specific response time window, the response signal indicative of the state information for the electrical device.

Yet another embodiment of the present invention teaches a multidrop circuit having master and slave devices coupled via a single wire bus. In this embodiment, the slave device is similar to the electronic slave device described above.

BRIEF DESCRIPTION OF THE DRAWINGS

Prior Art

Prior Art

BEST MODES FOR CARRYING OUT THE INVENTION

The present invention enables data communications between multiple devices over a single wire bus. This single-wire interface can be used for sensors, amplifiers analog-to-digital converters (ADCs), or any other circuit which would normally have an electrical output. Advantages of the present invention include a reduction in device pin count, conservation of the limited number of I/O pins on the control device, and reduced board layout complexity.

Speaking generally, each slave device coupled to the single wire bus interface is assigned a different response time window. For example, each slave device may be manufactured with a different time conversion function assigned to encode its analog data. This enables multiple parts to respond to an initial trigger signal generated by the master device without overlapping responses being generated on the single wire bus interface. More specific aspects as well as a variety of embodiments are described below.

Figure 1:
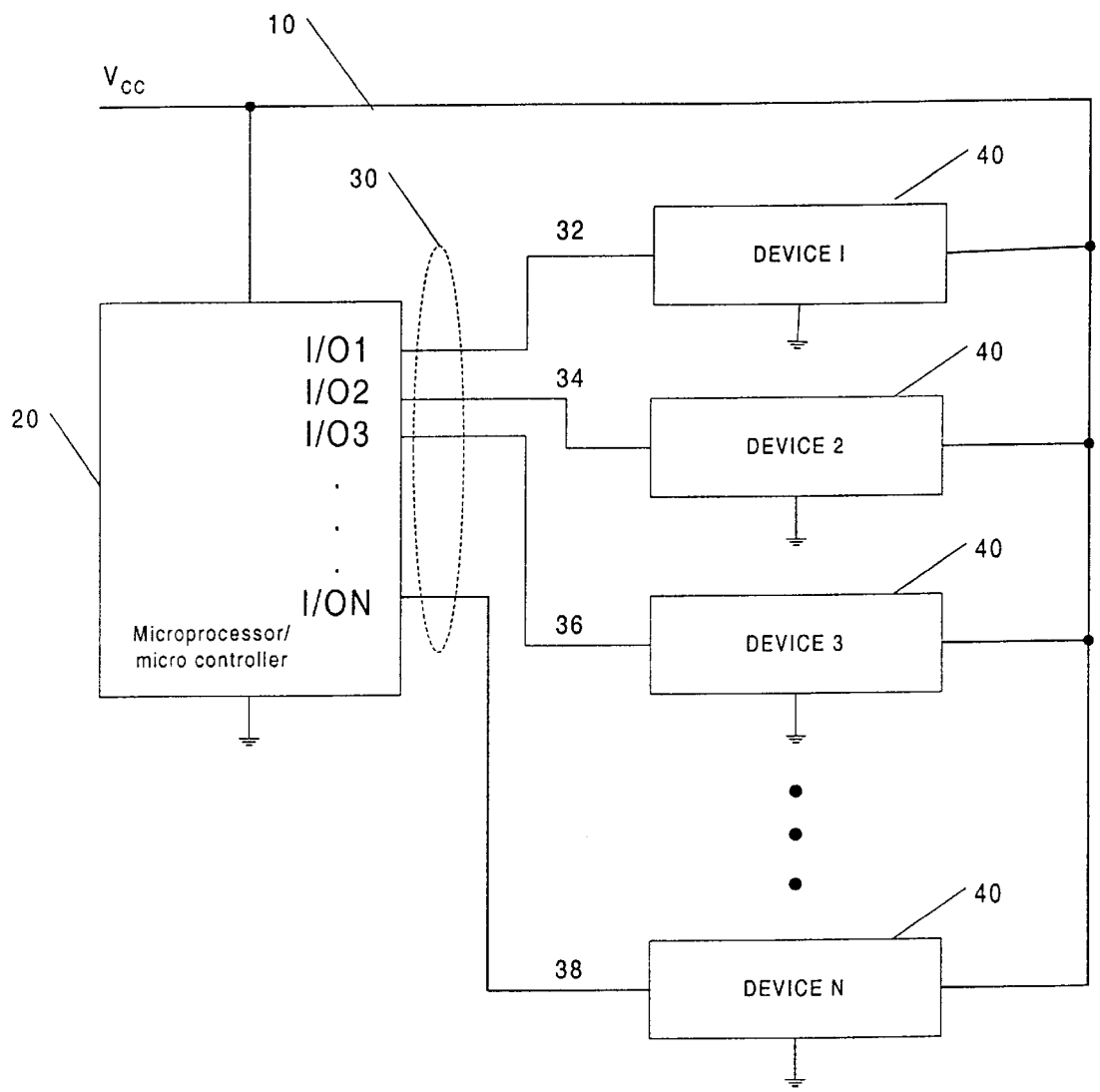
FIG. 1 illustrates a block diagram of a microprocessor or micro controller in a typical connection to multiple input devices.
Figure 2:
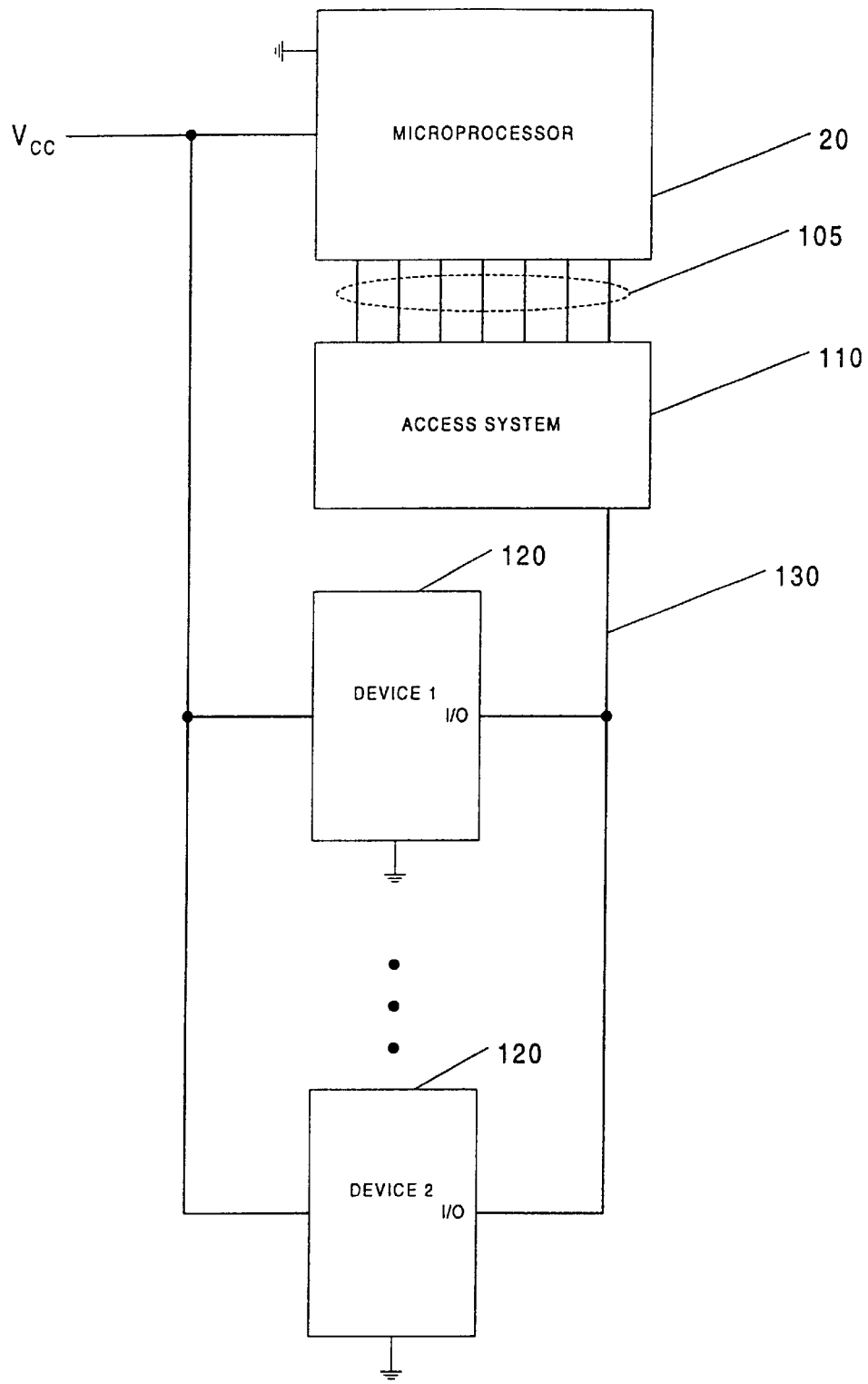
FIG. 2 illustrates a block diagram of a microprocessor or micro controller connected to multiple input devices through an access system interface device.
Figure 3:
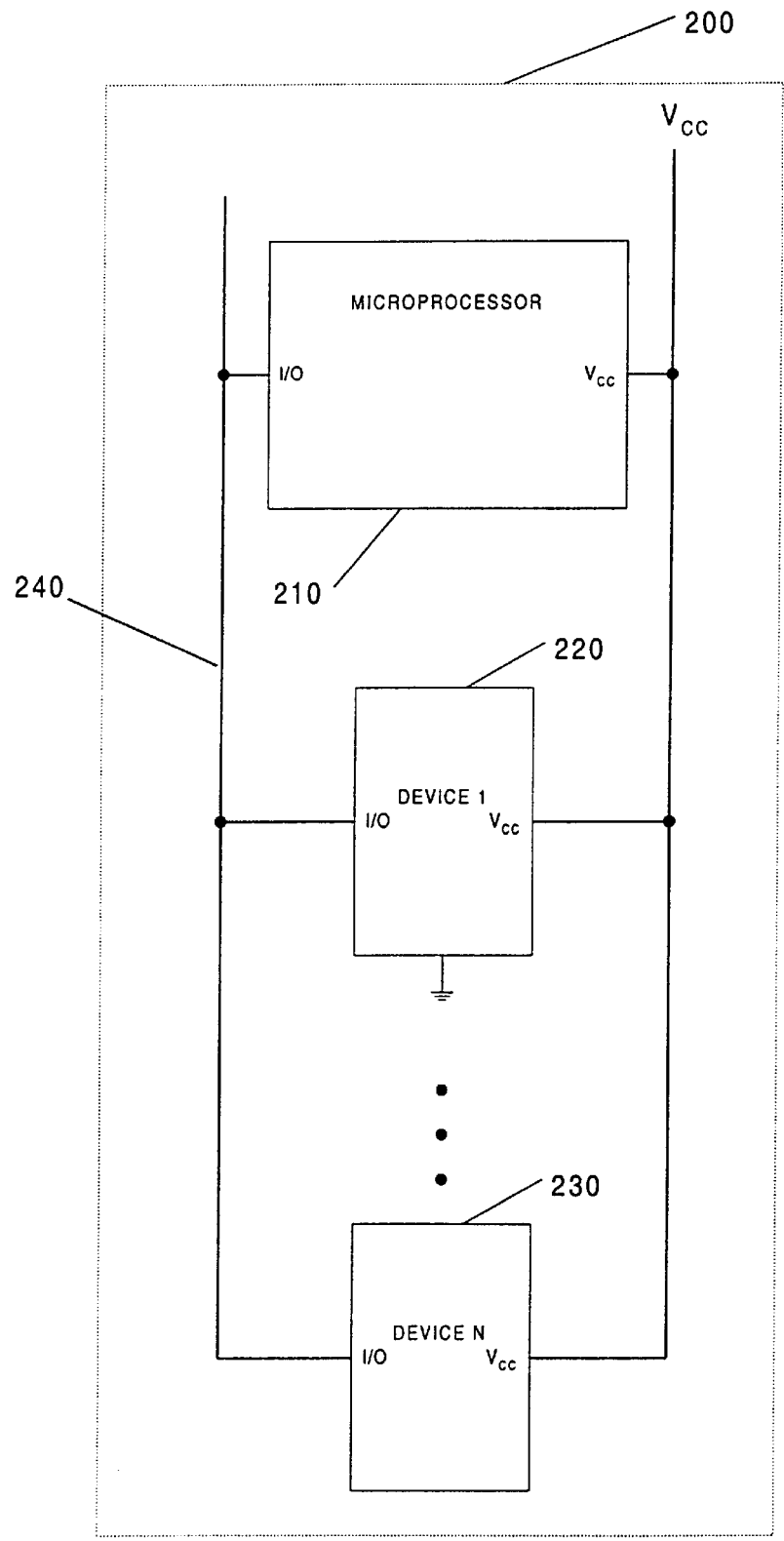
FIG. 3 illustrates a block diagram of a microprocessor connected to multiple input devices through a single wire bus in accordance with one embodiment of the present invention.

FIG. 3 illustrates a multidrop system 200 in accordance with a first embodiment of the present invention. The multidrop system 200 includes a microprocessor 210 with an I/O terminal connected to a single data line of a serial data bus 240 which is also connected to multiple input devices 220, 230. All input devices 220, 230 are also supplied by $V_{cc}$. In this embodiment, the microprocessor 210 maintains the data bus 240 at an idle state or low logic level of $V_{cc}$.

Figure 6:
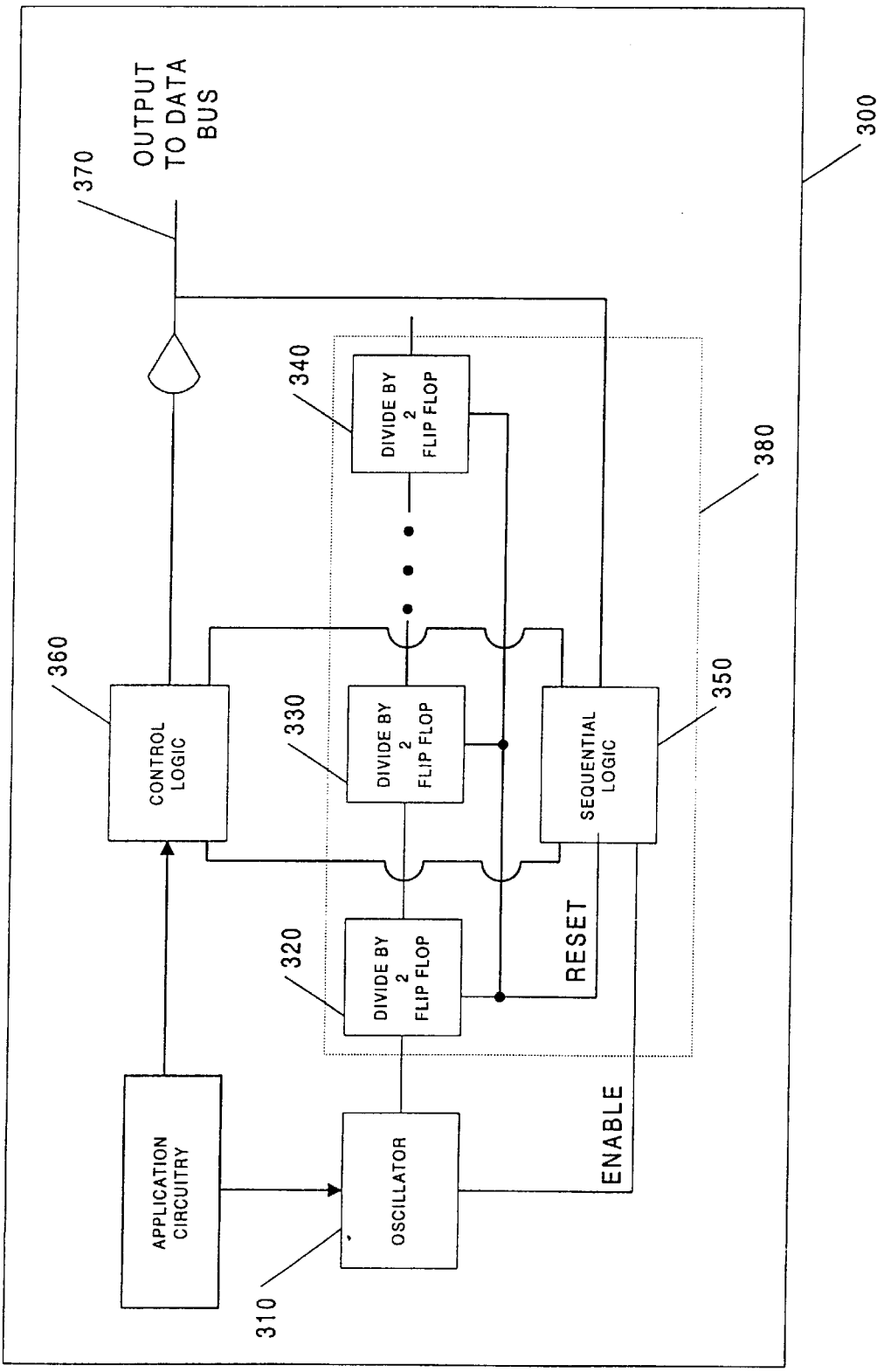
FIG. 6 is a block diagram of an input device in accordance with yet another embodiment of the present invention.

Each input device 220, 230 may have an internal clock regulated by an internal crystal. The internal clocks independently control the timing of each input device. FIG. 6, discussed below further illustrates one suitable embodiment of the internal circuitry for an input device. Alternatively, it is contemplated that a single oscillator may be suitably designed to provide the timing clock for all devices of the multidrop system 200.

The microprocessor 210 initiates the data output from the input devices 220, 230 by momentarily applying a high logic level (approximately 0 vdc) start signal to the data bus 240. In response to this start signal on the data bus 240, each of the input devices 220, 230 reset internally. After the input devices are reset, each input device 220, 230 begins counting the time delay to the input devices' respective time slot or response window. The microprocessor 210 also begins counting in order to track the response windows.

Each input device 220, 230 will have a set output range the microprocessor is able to process such as 1.0–2.0 vdc. The output range would be specified to meet the range within which the operator selects input from that input device.

Each input device 220, 230 is also assigned a specific, unique conversion function. The conversion function is selected to meet the expected data parameters and set individually in each input device. For example, the conversion function may convert the analog data to a time delay. More specifically in this example, the first input device 1 is a voltage output device assigned a conversion function of 2 ms/v, a set output range of 1.0–2.0 vdc and an actual output of 1.5 vdc. Input device 1 would start producing a signal output 2 ms (1.0 vdc×2 ms/v=2 ms) after the start signal from the microprocessor 210. Input device 1 pulls the data bus low and holds the data bus at a high logic level starting at this time point. About 1 ms later (1.5 vdc×2 ms/v=3 ms after start signal) the input device 1 would set the voltage on the data bus to $V_{cc}$. The input device 1 would apply a low logic level ($V_{cc}$ in this case) on the data bus for about an additional 1 ms (2.0 vdc×2 ms/v=4 ms after start signal) to fill in the response window assigned to the input device 1. About 4 ms after the start signal, input device 1 will release the data bus line. The line will continue at a low logic level until the next input device pulls the line low.

The microprocessor 210 registers the time from the beginning of the high logic level pulse at 2 ms to the rising data pulse at 3 ms. The microprocessor 210 will translate this data point to determine the output of input device 1 to be 1.5 vdc.

The following table shows a few examples of conversion functions and how conversion functions may be used to determine response windows. Conversion functions may be any function necessary so that the resulting response windows do not overlap. Conversion functions may be a simple multiplying factor or may be a multiplying factor with a specified time delay added to the resulting product. Conversion functions and the range may be adjusted to fit the needs of the particular application.

Example Conversion Functions and Response windows

| Input device # | Conversion Function | Range Minimum | Range Maximum | Resulting response window |
|---|---|---|---|---|
| 1 | 2 ms/v | 1.0 vdc | 2.0 vdc | 2–4 ms |
| 2 | 5 ms/v | 1.0 vdc | 3.0 vdc | 5–15 ms |
| 3 | (10 ms/v) + 30 ms | 1.0 vdc | 1.5 vdc | 40–45 ms |
| 4 | (5 ms/v) + 70 ms | 0.5 vdc | 3.5 vdc | 72.5–87.5 ms |
| 5 | (4 ms/v) + 100 ms | 1.0 vdc | 5.0 vdc | 104–120 ms |
|  | (10 ms/v) + 120 ms | 1.0 vdc | 3.0 vdc | 130–160 ms |

As will be appreciated, the scheme of the present invention theoretically provides an unlimited number of input devices and resulting response windows. The limiting factor is determined by practical application considerations such as how often data from each input device is required in the microprocessor 210. If, for example, data from all input devices must be received every 500 milliseconds, then the response window for the last input device N must end less than 500 milliseconds after the initial start pulse from the microprocessor.

Figure 4:
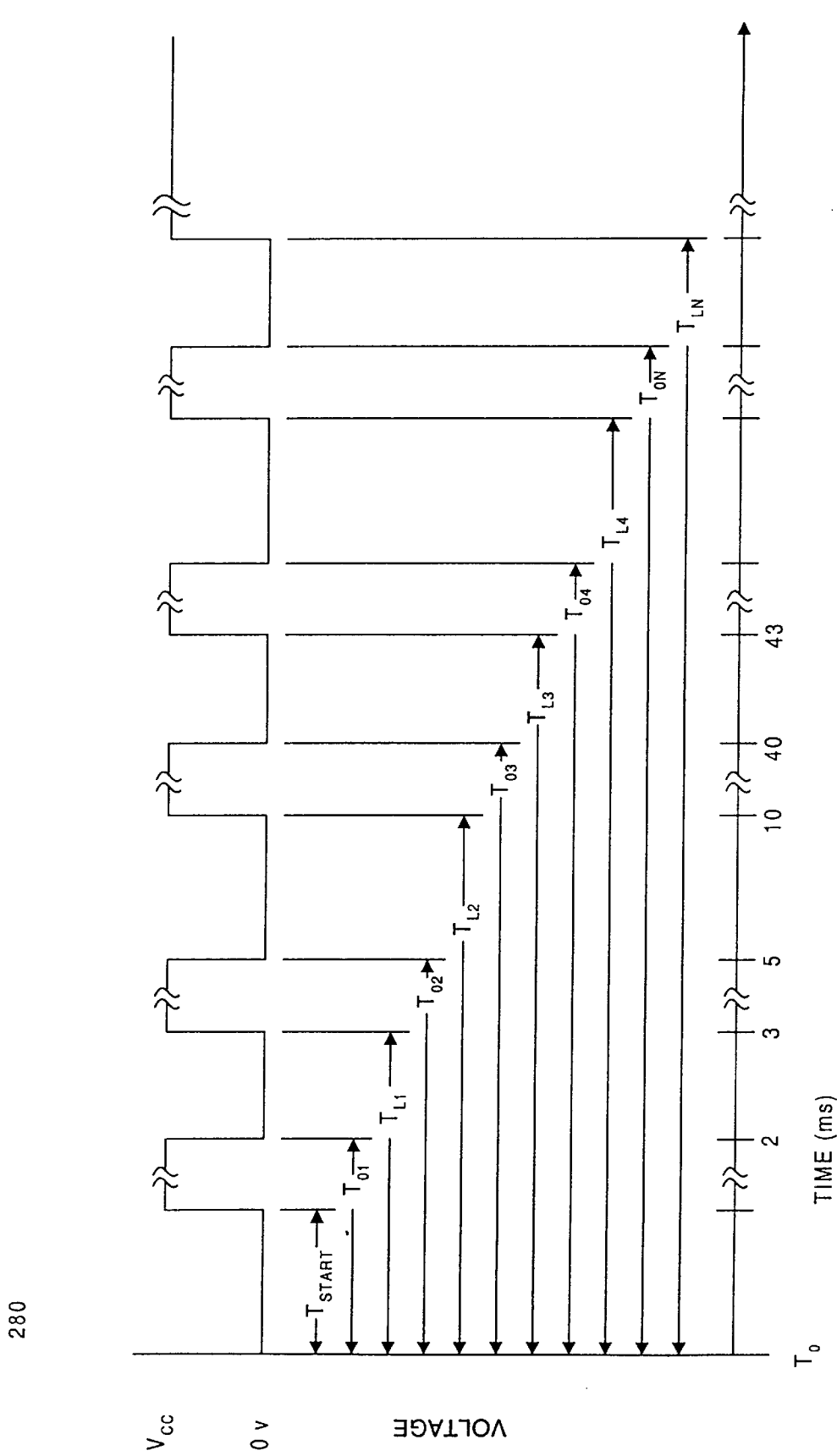
FIG. 4 illustrates an example data process in accordance with one aspect of the present invention, the data process being suitable for communications on the single wire bus depicted in FIG. 3.

FIG. 4 illustrates an example timing sequence 280 for the embodiment illustrated in FIG. 3. At $T_0$ the microprocessor 210 pulls the data bus 240 low (approximately 0 vdc) to a high logic level and holds the data bus 240 low for a time $T_{start}$. In preferred embodiments, $T_{start}$ is a short, predetermined length of time. At the end of $T_{start}$, the microprocessor 210 releases the data bus 240 and the data bus 240 returns to the data bus 240 low logic level state at $V_{cc}$.

When the microprocessor 210 pulls the data bus 240 low, at the beginning of $T_{start}$, all input devices are reset and begin to count their respective response windows. The time range or response window for input device 1 data is 2.0 to 4.0 ms. Input device 1 begins to count the beginning of the assigned response window represented by $t_{O1}$. As shown in the Figure, the response window $t_{O1}=2$ ms for the example above (1.0 vdc×2 ms/v=2 ms). At the end of the response window $t_{O1}$, input device 1 pulls the data bus 240 to a high logic level.

The time delay response $t_{L1}$ represents the analog data presented as the time delay for input device 1 to send data to the microprocessor 210. The time delay response $t_{L1}$ may be of any time delay that falls within the time range assigned in both input device 1 and the microprocessor 210. In the above example, the actual output of input device 1 is 1.5 vdc. The conversion function of 2 ms/v translates the voltage to 3 ms (1.5 vdc×2 ms/v=3 ms after the start pulse) therefore $t_{L1}=3$ ms.

The time range or response window for input device 2 data is 5.0 to 15.0 ms. At $T_0$, input device 2 begins to count to the beginning of the assigned response window represented by $t_{O2}$. The time delay response $t_{O2}=5$ ms for the example data above. At the end of $t_{O2}$, input device 2 pulls the data bus 240 low.

$t_{L2}$ represents the analog data presented as the time delay for input device 2 to send data to the microprocessor 210. $t_{L2}$ may be of any time delay that falls within the time range assigned in both input device 2 and the microprocessor 210. If input device 2 is representing an output of 2.0 vdc, this is translated to (2 vdc×5 ms/v=10 ms) therefore $t_{L2}=10$ ms.

The time range or response window for input device 3 data is 40 to 55 ms. At $T_0$, input device 3 begins to count to the beginning of the assigned response window represented by the time delay response $t_{O3}$. The time delay response $t_{O3}=40$ ms for the example data above ([1.0 vdc×10 ms/v]+ 30 ms=40 ms). At the end of the time delay response $t_{O3}$, input device 3 pulls the data bus 240 low.

The time delay response $t_{L3}$ represents the analog data presented as the time delay for input device 3 to send data to the microprocessor 210. $t_{L3}$ may be of any time delay that falls within the time range assigned in both input device 3 and the microprocessor 210. If input device 3 is representing an output of 1.3 vdc, this is translated to ([1.3 vdc×10 ms/v]+30 msec=43 ms) therefore $t_{L3}=43$ ms.

The process is repeated with input devices 4, 5, . . . N at each input device's respective times ($t_{O4}, t_{O5}, \ldots t_{ON}$ and $t_{L4}, t_{L5}, \ldots t_{LN}$). The last input device, N, releases the data bus 240 to return to the data bus' 240 idle state at $V_{cc}$.

Figure 5:
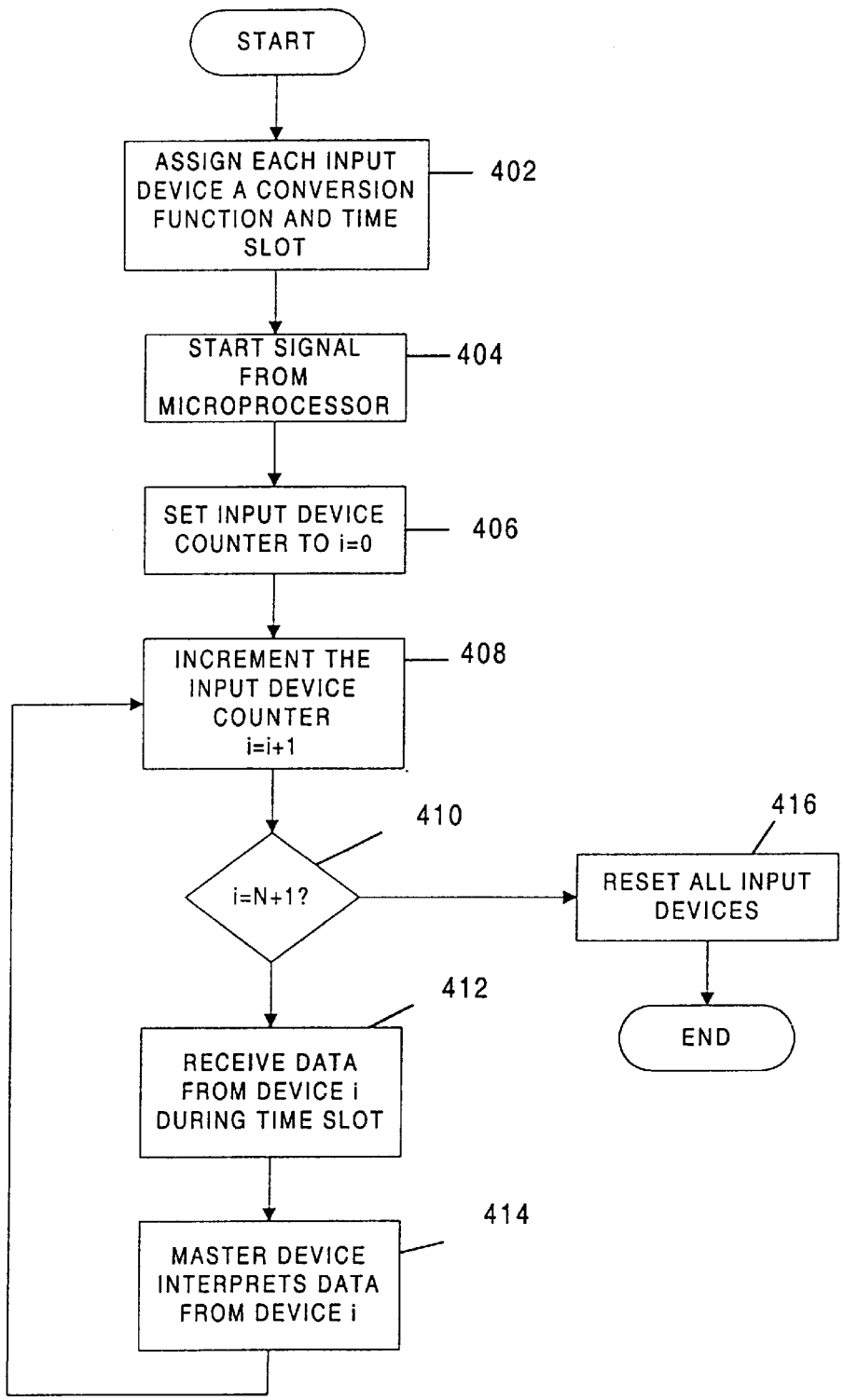
FIG. 5 is a flowchart describing a method for setting up a system as depicted in FIG. 3, the method in accordance with one embodiment of the present invention.

FIG. 5 illustrates by flow chart a method 400 in accordance with one aspect of the present invention. In a step 402 each input device must be assigned a conversion function and the resulting response window. This assignment must take place in two locations: First, within each input device and, second, inside the microprocessor 210. This enables the microprocessor 210 to correctly associate the received data from each input device.

In a next step 400 the microprocessor 210 requests data by starting the process. In particular, in the step 400 the microprocessor 210 starts the process by momentarily pulling and holding the data bus 240 to a high logic level as described above.

Control is then passed to a step 406 which illustrates the microprocessor 210 setting the internal input device counter (i) to i=0. In a step 408, the microprocessor 210 increments the i to i=1. In a step 410, the microprocessor determines whether all the response windows have concluded. For example, if i=1, then the first response window has not yet passed. During these time response windows, illustrated by steps 410–414, the microprocessor 210 is waiting to receive data from input device 1. Later, when i=2, the first response window has passed and the second response window is in process. During this time period, the microprocessor 210 is waiting for data from input device 2. The process continues through i=3, . . . N. When i=N+1, all response windows have passed and the microprocessor 210 restarts the cycle. The cycle is restarted by first holding the data line at the data bus' 240 idle state at $V_{cc}$. Finally, in a step 416, all the input devices are once again reset by pulling the data bus 240 to a high logic level for a set time period.

FIG. 6 illustrates a block diagram of one suitable embodiment of the input device internal circuitry required for the embodiment illustrated in FIG. 3. As shown therein, an input device 300 includes an oscillator 310, a plurality of divide by two flip-flops 320–340 connected in series, a sequential logic 350, and a control logic 360.

The plurality of divide by two flip-flops 320–340 and a sequential logic 350, taken together, essentially form a counter 380. The counter 380 counts the number of cycles from the oscillator 310 since the last reset input to the sequential logic circuit 350. Thus when the flip-flop circuits 320–340 are allowed to continue to count, eventually the flip-flop circuits 320–340 will send a reset pulse to the sequential logic circuit 350. This reset sequence allows the counter 380 to automatically reset when the external reset command is lost or fails to arrive for some reason. This reset sequence also limits the maximum time for a reset/start command from the master device on the serial bus.

The oscillator 310 is preferably a crystal controlled oscillator. The output of the oscillator is applied to the counter 380. The control logic 360 controls the operation of the input device. The control logic also includes a method of setting the conversion function for the input device 300. The control logic 360 processes the conversion function assigned to the individual input device 300.

The input device 300 is connected to an analog voltage output device such as a temperature, voltage, pressure or acceleration sensor or any other analog output device, hereafter referred to as "sensor." The sensor output may be coupled to either the input of the oscillator 310 or the control logic 360.

If the sensor output is coupled to the input of the oscillator 310, then the sensor output modulates the oscillator 310 frequency via a voltage to frequency conversion circuit. The modulation or variation of the oscillator 310 frequency by the sensor output alters the timing of the flip-flops 320–340 an amount corresponding to the analog sensor output. The control logic 360 is programmed with the assigned conversion function for the individual input device 300. The conversion function is applied to the output of the counter 380. When the output of the counter 380 matches the conversion function programmed into the control logic 360, the control logic 360 applies a low to the output 370 of the input device 300. For example, if the conversion function is a simple multiple such as 8, the control logic 360 would apply the output of the counter 380 through three additional flip-flops (or an equivalent circuit) internal to the control logic 360. The output of the additional flip-flops would be applied directly to the output 370.

If the sensor output is coupled to the control logic 360, the analog signal is converted to a digital signal using a analog to digital converter in the control logic 360. In this configuration, the oscillator 310 frequency remains stable. The control logic 360 compares the digital representation of the sensor output with the counter 380 output. When the output of the counter 380 matches the output of the sensor, the control logic applies a low to the output 370 of the input device 300. For example, if the conversion function is a multiple such as four plus a delay of 30 ms, the control logic will compare the digital representation of the sensor output with the counter, then, when the two sources match, the control logic then processes the data through additional flip-flops (or an equivalent circuit) internal to the control logic 360 to multiply the result by four, then wait an additional 30 ms, and then apply the output signal to the output 370 of the input device 300.

Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

I claim:

1. A method for controlling communication over a single wire bus interface for a multidrop circuit, the multidrop circuit including a master device and a first slave device coupled together via the single wire bus, the first slave device being assigned a first window of response, the method comprising the steps of:

initiating a timing sequence by transmitting a start command on the single wire bus interface;

during the first window of response, communicating data associated with the first slave device; and providing a conversion function circuitry that includes a plurality of flip-flop devices, the flip-flop devices arranged to delay a response signal until the first window of response.

2. A method as recited in claim 1, wherein the start command is generated by the master device.

3. A method as recited in claim 1, wherein an idle state for the single wire bus interface is high, and the start command corresponds to pulling the single wire bus interface low.

4. A method as recited in claim 3 wherein the timing sequence is initiated upon a falling edge of the start command.

5. A method as recited in claim 4 wherein the step of communicating data associated with the first slave device includes a response of pulling the single wire bus interface low.

6. A method as recited in claim 5 wherein the data associated with the first slave device includes data encoded as a time delay between the falling edge of the start command and a falling edge of the response.

7. A method as recited in claim 6 wherein the first slave device is an analog-to-digital converter and the time delay between the falling edge of the start command and the falling edge of the response is a function of an analog value measured by the analog-to-digital converter.

8. A method as recited in claim 7 wherein the analog-to-digital converter is a temperature sensor and the analog value corresponds to temperature.

9. A method as recited in claim 7 wherein the analog-to-digital converter is a voltage sensor and the analog value corresponds to voltage.

10. A method as recited in claim 7 wherein the analog-to-digital converter is a pressure gauge and the analog value corresponds to pressure.

11. A method as recited in claim 7 wherein the analog-to-digital converter is an accelerometer and the analog value corresponds to acceleration.

12. A method as recited in claim 1 wherein the first slave device is one of a plurality of slave devices coupled on the single wire bus interface, each of said plurality of slave devices being assigned a unique window of response such that there exists a plurality of response windows forming the timing sequence, the method further comprising the steps of communicating data associated with each slave device during the associated unique window of response.

13. A method as recited in claim 12 wherein each unique window of response is a unique time period selected such that no overlap exists between each unique window of response.

14. A single wire communications protocol enabling a master device to control communications for a multidrop circuit over a single wire bus interface, the multidrop circuit suitable arranged to couple the master device and a plurality of slave devices via the single wire bus interface, each slave device being assigned a unique window of response, the protocol comprising instructions for:

initiating a timing sequence by transmitting a start command on the single wire bus interface;

processing data received during each window of response including interpreting data received during each unique window of response as corresponding to the particular slave device assigned to that unique window of response; and delaying each window of response with conversion function circuitry which includes a plurality of flip-flop devices arranged to delay a response signal for each slave device until each slave devices unique window of response.

15. A single wire communications protocol as recited in claim 14 further comprising the step of determining each time delay between the start command and every response received.

16. A single wire communications protocol as recited in claim 15 wherein a first of the plurality of slave devices is an analog-to-digital converter and the time delay between the start command and a response from the first slave device is a function of an analog value measured by the analog-to-digital converter.

17. An electrical device suitable for use as a slave device in a multidrop application, the multidrop application arranged for data communications between a master device and multiple slave devices over a single wire bus, each electrical device being assigned a different response time window, the electrical device comprising:

application circuitry providing state information for the electrical device;

an input/output pin suitable for making an electrical coupling external to the electrical device; and a single wire bus interface coupled to the input/output pin and the application circuitry, the single wire bus interface having conversion function circuitry defining a specific response time window for the electronic device, the single wire bus responsive to a start signal received on the input/output pin to generate a response signal within the specific response time window, the response signal indicative of the state information for the electrical device; wherein the conversion function circuitry includes a plurality of flip-flop devices, the flip-flop devices arranged to delay the response signal until the specific response time window.

18. An electrical device as recited in claim 17, the application circuitry operable to generate the state information for the electrical device in response to a sensed an analog value.

19. An electrical device as recited in claim 18 wherein the analog value to which the application circuitry is responsive to temperature.

20. An electrical device as recited in claim 18 wherein the analog value to which the application circuitry is responsive is pressure.

21. An electrical device as recited in claim 18 wherein the analog value to which the application circuitry is responsive is a voltage potential.

22. An electrical device as recited in claim 18, the electrical device further comprising an internal clock coupled to the single wire bus interface, the single wire bus interface using the internal clock to track time lapse in order to generate the response signal within the specific response time window.

23. An electrical device as recited in claim 22, the internal clock including a crystal oscillator.

24. A multidrop circuit comprising:

a single wire bus;

a master device coupled to the single wire bus;

a first slave device coupled to the single wire bus and assigned a specific response time window, the first slave device including:

application circuitry providing state information for the slave device; and a single wire bus interface coupled to the single wire bus and the application circuitry, the single wire bus interface having conversion function circuitry defining the specific response time window for the electronic device, the single wire bus interface responsive to a start signal transmitted on the single wire bus to generate a response signal within the specific response time window, the response signal indicative of the state information for the slave device; wherein the conversion function circuitry includes a plurality of flip-flop devices, the flip-flop devices arranged to delay the response signal until the specific response time window.

25. A multidrop circuit as recited in claim 24, the application circuitry operable to generate the state information for the slave device in response to a sensed an analog value.

26. A multidrop circuit as recited in claim 25 wherein the analog value to which the application circuitry is responsive to temperature.

27. A multidrop circuit as recited in claim 25 wherein the analog value to which the application circuitry is responsive is pressure.

28. A multidrop circuit as recited in claim 25 wherein the analog value to which the application circuitry is responsive is a voltage potential.

29. A multidrop circuit as recited in claim 25, the slave device further comprising an internal clock coupled to the single wire bus interface, the single wire bus interface using the internal clock to track time lapse in order to generate the response signal within the specific response time window.

30. A multidrop circuit as recited in claim 29, the internal clock including a crystal oscillator.

31. A multidrop circuit as recited in claim 24 wherein the master device includes a central processing unit.

32. A multidrop circuit as recited in claim 24 wherein the master device includes a microprocessor.

33. A multidrop circuit as recited in claim 24 wherein the master device includes a digital signal processor.

* * * * *